United States Patent Office 3,394,602
Patented July 30, 1968

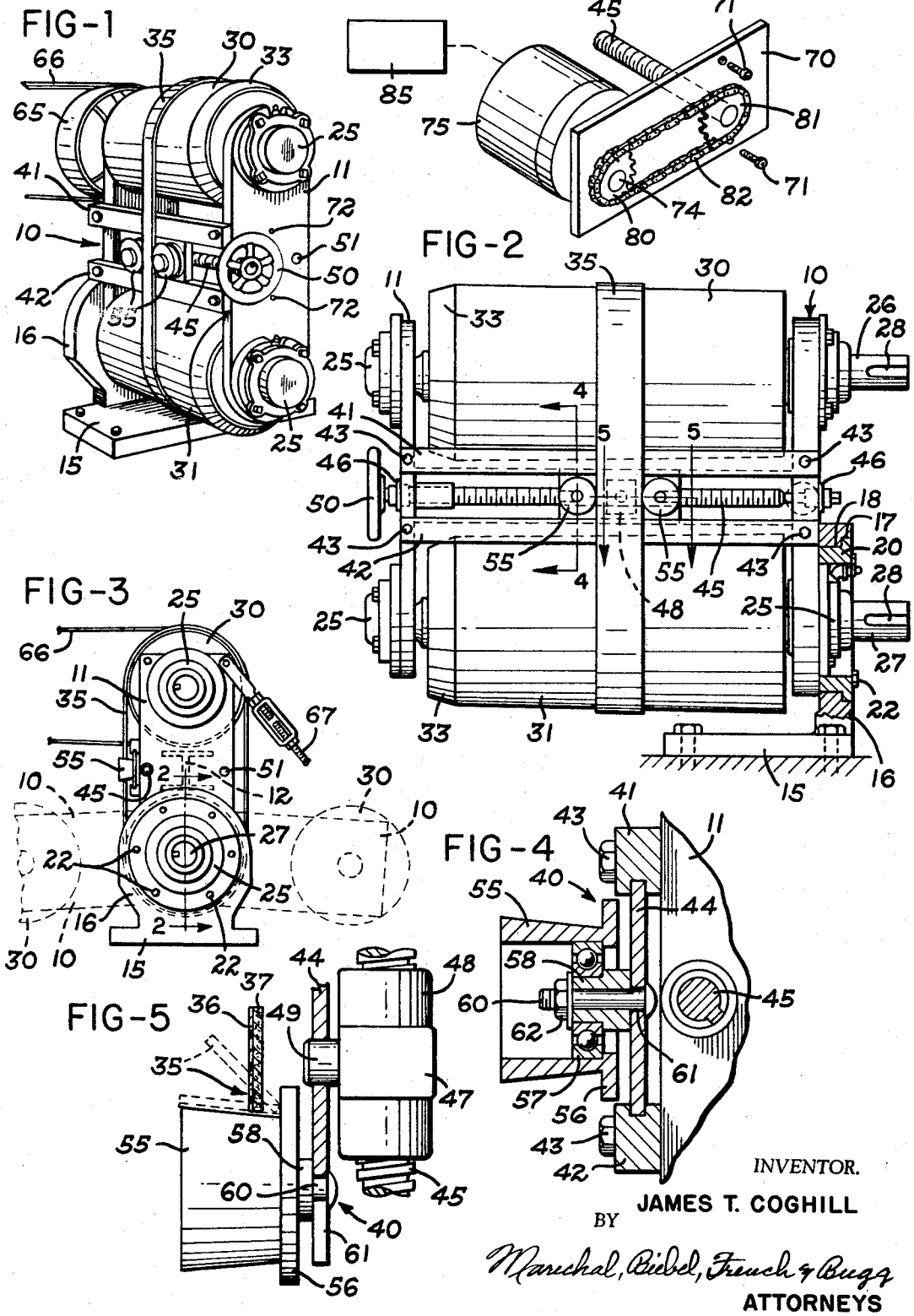

3,394,602
VARIABLE SPEED TRANSMISSION
James T. Coghill, Rochester, N.Y., assignor to The Black-Clawson Company, Hamilton, Ohio, a corporation of Ohio
Filed Mar. 18, 1966, Ser. No. 535,522
9 Claims. (Cl. 74—192)

ABSTRACT OF THE DISCLOSURE

A variable speed belt transmission includes a pair of parallel frame arms supporting the pulley shafts in braced parallel relation, the drive ends of the shafts are located at one of the frame arms, and the other frame arm is proportioned to lie entirely within the outline defined by a belt encircling the pulleys on the shafts to provide for directly mounting the belt on the pulleys over this frame arm. Additional features including mounting of the transmission for swinging adjustment about the axis of one of the shafts, and pulleys of relatively flat taper each having a short section of steep taper at its outer end to facilitate mounting of a new belt.

---

This invention relates to a variable speed transmission of the type commonly referred to as a "cone pulley" transmission, and more particularly to an improved transmission unit which provides several novel and desirable features in addition to precise speed adjustment of the output shaft relative to the input shaft.

The transmission of the present invention is ideally suited for use on papermaking and processing machinery wherein it is essential to control with precision the peripheral speed of the rolls which drive or engage a paper web to avoid stretching, tearing or producing slack within the web. However, it is to be understood that this transmission unit may have other applications.

This invention has particular relation to the use in variable speed transmission units of flat drive belts of the "nylon core" type, which can be generally described as comprising a main layer of oriented nylon bonded to a cover layer of leather or other friction material. Belts of this type are especially characterized by properties of low stretch and high elastic recovery which they retain over extended periods of use, apparently due at least in part to the plastic memory of the nylon layer. For example, the invention has been successfully practiced with commercally available such belts which can be stretched up to about 4% elongation and which are capable of recovering back to a total retained elongation of only about 1%.

It is a primary object of the present invention to provide a variable speed transmission which is especially designed to employ belts of the type outlined above and to take maximum advantage of the low stretch and high recovery properties of such belts, and it is a particular object of the invention to provide such a transmission embodying cone pulleys spaced on short centers for maximum overall compactness of structure.

Another object of the invention is to provide a variable speed cone pulley transmission of essentially unitary construction capable of production as a complete unit, including supporting structure and both input and output shafts, as contrasted with conventional multi-component belt transmissions, and which is therefore highly versatile as well as simple to install and maintain.

An additional object of the invention is to provide a variable speed belt transmission of such unitary construction as outlined above that it is capable of angular adjustment as a unit about the axis of either of its pulley shafts in accordance with desired operating conditions, such as for the purpose of adjusting the tension in a belt drive to its input shaft.

It is also an object of the invention to provide a variable speed cone pulley transmission adapted for use with low stretch and high recovery belts wherein the cone pulleys are of special construction promoting mounting of a belt thereon under high stretch forces with minimum effort.

A further object of the invention is to provide a variable speed belt transmission as outlined above incorporating a guide arrangement for the belt which is especially designed and constructed to promote proper shifting of the belt with minimum possibility of damage thereto.

A still further object of the invention is to provide a variable speed cone pulley transmission of such design and construction that a new belt may be mounted in operating position thereon without requiring removal or disassembly of any other part of the transmission.

Other objects and advantages of the invention will be apparent from the following description, the accompanying drawings and the appended claims.

In the drawings—

FIG. 1 is a perspective view of a transmission unit constructed in accordance with the invention;

FIG. 2 is a side elevational view of the transmission unit of FIG. 1, partly in section on the line 2—2 of FIG. 3, and with the belt adjusting mechanism on the opposite side from FIG. 1;

FIG. 3 is an end elevational view of the transmission unit of FIG. 2;

FIG. 4 is an enlarged fragmentary section on the line 4—4 of FIG. 2;

FIG. 5 is an enlarged fragmentary section on the line 5—5 of FIG. 2; and

FIG. 6 is a somewhat diagrammatic perspective view of a mechanism for remotely controlling the shifting of the belt in its unit of FIGS. 1–3.

Referring to the drawing, which illustrates a preferred embodiment of the invention, all of the operating parts of the transmission unit shown in FIGS. 1–3 are carried by a generally H-shaped frame comprising an inner arm 10, an outer arm 11, and a cross member 12 (FIG. 3) shown as an I-beam. This H-frame, with all of the parts carried thereby, is shown as having a cantilever mounting comprising a base plate 15 provided with a vertically extending bracket portion 16 on one end thereof. The bracket 16 has a circular hole 17 (FIG. 2) therethrough provided with a counter-bore 18 on one side, and the connection between the H-frame and the bracket 16 is provided by a flanged retaining ring 20 which seats within the hole 17 and counter-bore 18 and is clamped to one end of the arm 10 by a series of screws 22.

The frame arms 10 and 11 are provided at opposite ends with aligned bores for receiving the bearing assemblies 25 which mount the pulley shafts 26 and 27 with one end of each projecting through the arm 10 and provided with a keyway 28 or flat for positive connection with a pulley, gear or other shaft. The two cone pulleys 30 and 31 are keyed to otherwise secured on shafts 26 and 27, and are oppositely tapered over the major portions of their length, with the lower pulley 31 shown as having its maximum diameter at the end adjacent the frame arm 10. The degree of taper of the driving portions of pulleys 30 and 31 is relatively small, for example a total included angle of 2 to 3°, but the outer end of each of the pulleys is provided with a short section 33 of substantial taper, for example about 30%, for use in the mounting of a new belt as described in more detail hereinafter.

The belt 35 which forms the driving connection between pulleys 30 and 31 is shown in enlarged detail in FIG. 5 as being of the nylon core type including an oriented nylon outer layer 36 bonded to an inner friction surface layer 37. It will be apparent that the pulleys 30 and 31 are relatively closely spaced in comparison with their diameters, for example, with the spacing of their respective axes approximately 1.5 times the average diameter of one pulley in the case of pulleys having a maximum diameter of approximately 8 inches and an overall length of 12 inches exclusive of the tapered portion 33. With this close spacing of the pulleys, the belt 35 is stretched to develop relatively high tension, in the range of 500 to 3000 pounds by stretching the belt up to a maximum of the order of 4%.

The mechanism indicated generally at 40 for effecting shifting of the belt 35 on pulleys 30 and 31 includes a pair of guide rails 41 and 42 mounted in spaced parallel relation on the arms 10 and 11 as by means of screws 43. The rails 41-42 are grooved to guide a plate 44 for sliding movement controlled by a lead screw 45 journalled at opposite ends by suitable bushings 46 in the arms 10 and 11. The driving connection between screw 45 and plate 44 is provided by a nut 47 on screw 45 which has a guide yoke 48 and a lug 49 projecting into a hole in the center of plate 44. FIG. 2 shows the screw 45 as provided with a hand wheel 50 for manual rotation thereof.

The plate 44 forms a carriage on which a pair of belt guide rollers 55 are mounted in such spaced relation as to receive the belt 35 with running clearance therebetween. As best seen in FIG. 4, each of the rollers 55 is of frusto-conical section with its surface tapering outwardly from an annular flange or shoulder 56. Each roller 55 is mounted for free rotation on plate 44 by a bearing 57 and sleeve 58 on the stub shaft section of a carriage bolt 60 received within an open ended slot 61 at each end of the plate 44. A nut 62 on the outer end of each bolt 60 clamps the associated guide roller on plate 44 while providing for ready removal thereof for replacement of the belt 35 as described hereinafter. The adjusting mechanism 40 may be mounted on either side of the unit, as indicated by the extra hole 51 in arm 10 in FIG. 3 and as shown in FIG. 1.

As best seen in FIGS. 2 and 3, the compact unitary construction of the transmission provides relatively little space for the belt guide mechanism inside the belt 35. The individual construction of the belt guide rollers 55 is accordingly such as to assure that the belt 35 cannot bow or buckle inwardly when it is being adjusted on the pulleys. Thus as shown in FIG. 5, the normal position of the belt 35 is edgewise to the surface of the adjacent roller 55 so that lateral movement of the pulley will tend to push the belt parallel with its width. If the belt is pushed too hard, so that it tends to move inwardly, however, such movement will be limited by engagement with the flange 56, so that any further twisting movement of the belt must be outwardly as indicated by the dotted line positions in FIG. 5, thereby assuring that the belt will not be damaged by engagement with any stationary part of the frame or adjusting mechanism.

The functions of the shafts 26-27 and pulleys 30-31 are interchangeable, and the shaft 26 is shown in FIGS. 1 and 3 as the input shaft carrying a pulley 65 by which the drive is transmitted thereto through a belt 66 from a suitable remote drive source (not shown). One of the advantages provided by the unitary construction of the invention is that the entire unit can be rotated on the axis of either shaft, and specifically the shaft 27 in FIGS. 1-3 by loosening the clamp bolts 22, and this rotational adjustment may be employed to tighten the drive belt 66, as by means of an adjustable tensioning rod 67. The dotted positions of the arm 10 in FIG. 3 illustrate the extent of the angular range through which the unit can be adjusted about the fixed axis of shaft 27, which may for example be coupled to a gear box or other fixed driven unit, in accordance with the space requirements of a given installation.

Another major advantage provided by the invention is the ease of replacement of the belt 35. This does not require even partial disassembly of any of the main components of the unit, since the entire unit is cantilevered from the bracket 15, so that a new belt 35 can be mounted directly over the freely supported frame arm 11, which, as shown in the drawing, is proportioned to lie entirely within the outline of the belt in its mounted position on pulleys 30-31. In particular, changing of the belt does not require disconnection of either of the input or output connections of the transmission, since both connections are at the same end of the unit where its permanent mounting is located.

FIG. 3 illustrates the fact that the transmission of the invention is of such compact construction that in endwise view, it is entirely contained within the outline of the belt 35 mounted on the pulleys 30-31, with the sole exception of the two belt guide rollers 55, which necessarily project laterally beyond the belt in order to straddle it for adjusting movement. It is not practical in replacing the belt to attempt to stretch it over the outer guide roller 55, and this guide roller should therefore be temporarily removed, which is quickly accomplished by loosening its retaining nut 62 and sliding its mounting bolt 60 out of its supporting slit 61 on plate 44. With the outer roller 55 thus out of the way, the new belt is presented with mere hand pressure to the tapered end or lead on cone portions 33 of the pulleys 30-31 while the pulleys are rotated slowly by their associated drive. Under these conditions, even though forces as high as 3000 pounds may be needed to stretch the belt in place, the belt will first frictionally grab the surfaces 33 and then ride up them by itself until it is completely mounted on the primary pulley surfaces. Further adjustment of the belt is then effected by the adjusting mechanism 40 after replacement of the outer guide roller 55.

The hand wheel 50 illustrates the possibilities of manual adjustment of the belt 35, but it is preferable to provide remotely controllable means for driving the belt adjusting mechanism, and an example of suitable such means is shown somewhat diagrammatically in FIG. 6 as a replacement for the hand wheel 50. This unit includes a supporting plate 70 adapted for mounting on the arm 10 by screws 71 in tapped holes 72, and this plate 70 is slotted or bored near its opposite ends to receive the outer end of the lead screw 45 and the outer end of the drive shaft 74 of a motor 75 which is suitably mounted on plate 70. Sprockets 80 and 81 are mounted on motor shaft 74 and the end of the lead screw 45 and are connected by a drive chain 82.

The motor 75 may be provided with any suitable remotely operable controls, represented diagrammatically at 85, for establishing and maintaining a desired speed relation between the shafts 26 and 27. Thus the controls 85 may include manually operable switches or any of a variety of automatic controls capable of sensing variations from a pre-set speed relationship between shafts 26 and 27 and providing a correcting signal, such for example as the control system of Jordon et al. 3,049,313 issued Aug. 14, 1962, to the assignee of this invention.

The transmission of the invention has been found to possess outstanding practical advantages which will at least in part have become apparent from the foregoing description. In particular, it is capable of a high degree of precision control using a nylon core belt over an extended service life at speeds as high as 2000 r.p.m. In addition, the unitary cantilevered or overhung construction make this transmission extremely versatile as well as convenient to install, and the same features in combination with the tapered portions 33 of the cone pulleys greatly facilitate replacement of the belt when necessary. It has been found in practice, however, that a belt will provide many months of useful life, and this result is also aided by the novel guide roller arrangement of the belt adjusting mechanism, which minimizes the possibilities of damage to the belt even if the adjustment is carried out at too rapid a rate.

While the forms of apparatus herein described constitute a preferred embodiment of the invention, it is to be understood that this invention is not limited to these precise forms of apparatus and that changes may be made therein without departing from the scope of the invention which is defined in the appended claims.

What is claimed is:

1. An improved belt transmission of essentially unitary construction, comprising a generally H-shaped frame including a pair of opposed parallel arms and a cross member connecting said arms in spaced relation, a pair of shafts rotatably mounted in opposite ends of said arms with said arms maintaining said shafts in braced and spaced parallel relation, an elongated pulley mounted on each of said shafts between said arms, said pulleys having frusto-conical surfaces tapered in reversed relationship to each other, input drive means on one of said shafts, output drive means on the other said shaft, both of said drive means extending from the same one of said frame arms, the other of said frame arms being proportioned to lie entirely within the outline defined by an endless belt encircling said pulleys to provide for directly mounting such belt on said pulleys over said frame arm, and means on said frame for shifting such belt axially of said pulleys to adjust the speed relationship between said input drive means and said output drive means.

2. A transmission as defined in claim 1 comprising a base member, and means forming a cantilever mounting between one end of said one of said arms and said base member with the remainder of said unit freely supported therefrom.

3. A transmission as defined in claim 1 comprising a base member, and means forming a mounting between said base member and one end of said one frame arm constructed to provide for rotation of said frame on said base about the axis of one of said shafts.

4. A transmission as defined in claim 1 wherein said frusto-conical pulley surfaces are of relatively small degrees of taper, and each of said pulleys has a frusto-conical surface of substantial taper and short axial length on the outer end portion thereof remote from said one frame arm for promoting mounting of a high tension belt on said pulleys.

5. A transmission unit as defined in claim 1 wherein said shifting means includes a carriage mounted on said frame for movement parallel with said pulleys, rollers mounted on said carriage in spaced relation receiving said belt therebetween, and said transmission being so proportioned that viewed axially of said shafts, it lies entirely within the projected outline of said belt with the exception of said guide rollers.

6. A transmission unit as defined in claim 5 wherein each said guide roller is frusto-conical with the larger end thereof outermost, and each said roller having a peripheral flange at the smaller end thereof for limited movement of said belt along the surface of said roller toward the smaller end thereof.

7. A transmission as defined in claim 5 comprising stub shaft means for mounting said belt guide rollers on said carriage, and means forming a readily removable mounting for at least one of said stub shaft means on said carriage means.

8. A transmission as defined in claim 1 wherein the spacing between the axes of said shafts is less than twice the maximum diameter of either of said pulleys.

9. A transmission unit as defined in claim 4 wherein said shifting means includes a carriage mounted on said frame for movement parallel with said pulleys, a pair of rollers mounted on said carriage in spaced relation receiving said belt therebetween, stub shaft means mounting said rollers on said carriage, and means forming a readily removable mounting for one of said stub shaft means on the end of said carriage means nearest said frusto-conical surfaces on said pulleys providing for ready removal of said stub shaft means to facilitate changing of said belt.

References Cited
UNITED STATES PATENTS

| | | | |
|---|---|---|---|
| 2,430,798 | 11/1947 | Alexander | 74—242.15 |
| 2,633,227 | 3/1953 | Hutchins | 74—232 |
| 2,705,892 | 4/1955 | Yeager | 74—242.3 |
| 2,712,759 | 7/1955 | Guibert | 74—242.3 |
| 2,734,391 | 2/1956 | Schaelchlin et al. | 74—242.3 |
| 3,031,894 | 5/1962 | Chavand | 74—232 |

FOREIGN PATENTS 236,827  7/1945  Switzerland.

C. J. HUSAR, *Primary Examiner.*